Dec. 13, 1960 C. C. BROWNING 2,963,786
DENTAL PARTIAL IMPRESSION TRAY
Filed April 15, 1957 2 Sheets-Sheet 1
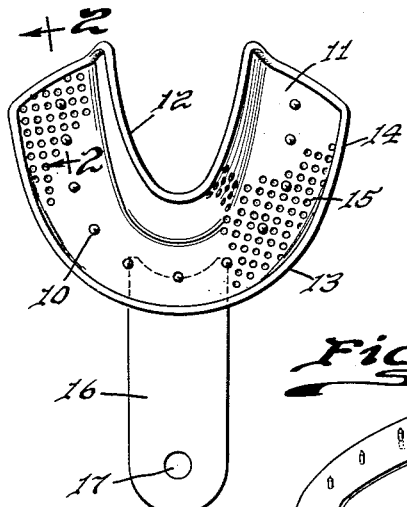
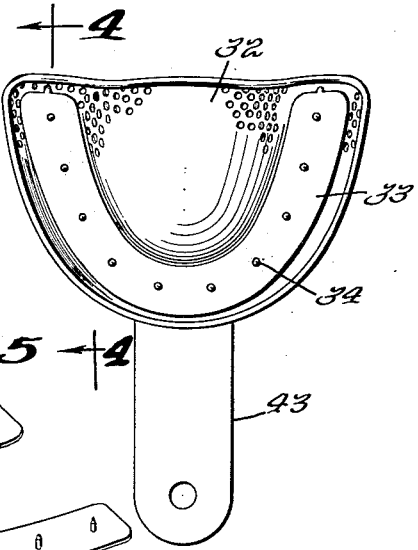
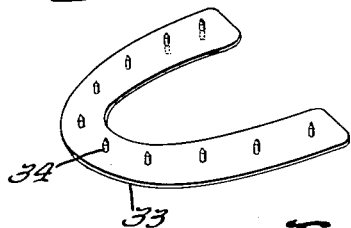
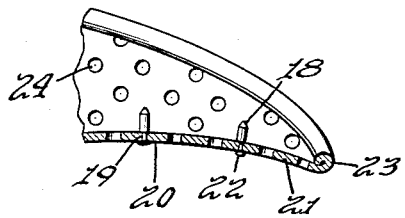
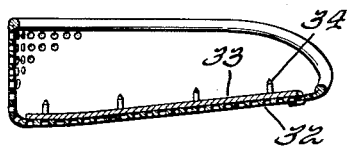
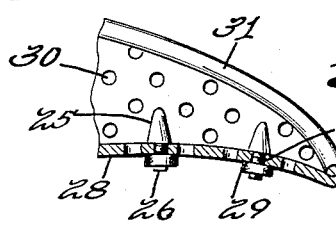
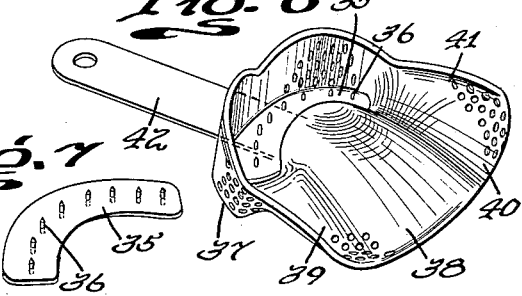
INVENTOR.
Charles C. Browning
BY Victor J. Evans & Co.
ATTORNEYS Dec. 13, 1960 C. C. BROWNING 2,963,786
DENTAL PARTIAL IMPRESSION TRAY
Filed April 15, 1957 2 Sheets-Sheet 2

INVENTOR.
CHARLES C. BROWNING
BY
*Parker & Carter*
ATTORNEYS

United States Patent Office 2,963,786
Patented Dec. 13, 1960

2,963,786

DENTAL PARTIAL IMPRESSION TRAY

Charles C. Browning, Box 475, Omar, W. Va.

Filed Apr. 15, 1957, Ser. No. 652,931

2 Claims. (Cl. 32—17)

This invention relates to trays, in particular, partial impression trays to be used in taking impressions for partial dentures, bridges, orthodontic appliances, inlays and onlays; in which means is provided for applying sufficient pressure on and at predetermined, limited, minimal areas of the occlusal surfaces of the teeth, thereby eliminating excess and unregulated pressure while holding the trays in the mouth during the setting of the impression material.

When an impression of the type mentioned is required, a suitable amount of alginate or other impression material is placed in a tray and the tray is then aligned with the area of the teeth of which an impression is desired. The tray is then pressed with a correct amount of pressure against the tooth area. If the pressure be insufficient an incomplete and therefore unsatisfactory impression often results. If the pressure be too great the teeth contact the bottom of the tray resulting in a spoiled impression. Means have been provided in the past serving to contact the gums in areas of missing teeth but the possibility of giving pain to the patient therewith limited the freedom to employ maximum pressure and the need for areas of missing teeth limited usability of such means. Similarly, non-rigid spacing means employed in the past permitted the teeth to contact the surface at the bottom of the tray.

One purpose of this invention, accordingly, is to provide rigid projecting elements so dimensioned with respect to the walls of an impression tray as to cause a thin or minimum area thereon to contact and thus to space occlusal surfaces of teeth, including teeth in which occlusal surfaces are worn, such as the teeth of an elderly patient, from the base of a tray to facilitate making an accurate and true impression whereby the final dentures are duplicates of original teeth replaced thereby.

The alginate or other material used in dental trays for taking impressions of teeth is adapted to be pierced completely by the teeth in taking a bite into the material and although different devices have been used in combination with trays for limiting the movements of the teeth through the impression material, definite means for effectively limiting the movement of the occlusal surfaces of the teeth into the material has not been provided. With this thought in mind, this invention contemplates elements positioned to be engaged by end surfaces of teeth whereby the biting action of teeth into the material, such as the alginate, is positively limited.

Another object of this invention is to provide improvements in trays for making dental impressions wherein a definite area of substantial thickness is provided between end surfaces of teeth and inner surfaces of trays whereby a thick wall of material is provided for connecting side walls of an impression or mold.

Another object of the invention is to provide spacing means in a dental tray in which the spacing means may be installed in trays now in use.

Another object of the invention is to provide means for spacing end surfaces of teeth from inner surfaces of trays for dental impressions wherein spacing elements are provided on a mounting plate and in which the mounting plate is adapted to be positioned in a tray without changing parts of the tray.

A further object of the invention is to provide an improved dental partial impression tray having spacing means therein for limiting the movement of end surfaces of teeth toward inner surfaces of a tray in which the tray and spacing elements are of simple and economical construction.

Another purpose is to provide means whereby sufficient impression material is retained between the occlusal surfaces and trays in which impressions are taken to provide a sufficient thickness of impression material to support the pouring of the stone into the impression, thus eliminating air bubbles and other discrepancies in processing an accurate stone working model.

Another purpose of the invention is to provide a spacing element for an impression tray wherein a thin, continuous upper edge is positioned to be definitely engaged by teeth biting into the tray while making the impression.

A further object of the invention is to provide an improved impression tray wherein a strip of material is extended through the intermediate part of the tray for preventing teeth cutting through the impression material and in which the device is of a simple and economical construction.

With these and other objects and advantages in view, the invention encompasses a tray substantially U-shaped in plan and also substantially U-shaped in cross section and spaced pins projecting from inner surfaces of the tray or adapted to be inserted in the tray in which the pins are positioned to cause their pointed ends only to engage end surfaces of teeth biting into alginate material positioned in the tray.

The invention further encompasses a dental impression tray, substantially horseshoe shaped in plan and a strip or strips of material or wire, having a sharp upper edge or edges, positioned in the base of the tray.

This application constitutes a continuation-in-part of my co-pending applications, Serial No. 494,672, filed March 16, 1955, and entitled "Dental Partial Impression Tray" and Serial No. 596,725, filed July 9, 1956, and entitled "Dental Partial Impression Tray Spacer" both now abandoned.

Other features and advantages of the invention will appear from the following description, taken in connection with the drawing, wherein—

Figure 1 is a plan view of a tray particularly adapted for a lower partial denture in which spaced pins extend upwardly from the inner surface of the lower portion thereof.

Figure 2 is a longitudinal section taken on line 2—2 of Figure 1 with the parts shown on an enlarged scale illustrating a mounting for pins in a tray wherein the pins are permanently secured in position such as by riveting ends thereof in openings of the tray, the main portion of the tray being broken away.

Figure 3 is a plan view of a tray particularly adapted for an upper denture showing a modification wherein spacing pins are provided on an insert adapted to be positioned in a tray.

Figure 4 is a longitudinal section through the tray shown in Figure 3 being taken on line 4—4 thereof showing the insert with pins thereon in one side of the tray.

Figure 5 is a view illustrating an insert having spaced pins extended from one surface and adapted to be dropped into a tray such as the tray shown in Figure 3.

Figure 6 is a view illustrating an insert having spaced pins thereon dropped into the end of a tray particularly adapted for a lower denture.

Figure 7 is a view showing the insert used in the tray of the modification shown in Figure 6.

Figure 8 is a section similar to that shown in Figure 2 illustrating a further modification wherein the spacing pins are provided with threaded studs and knurled nuts so that the pins may readily be mounted in a tray or removed from a tray.

Figure 9:
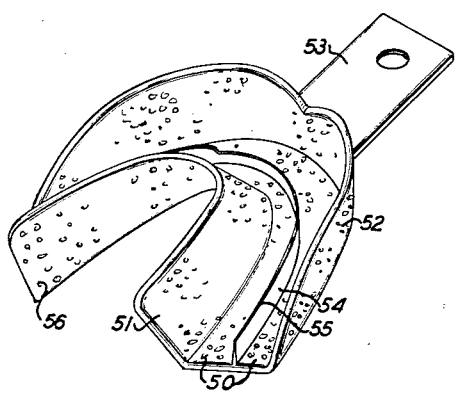
Figure 9 is a view illustrating an impression tray having a strip of material providing a spacing element therein.

Referring now to the drawings, wherein like reference characters denote corresponding parts, the improved spacing means for dental trays of this invention includes spaced pins 10 mounted in an inner surface 11 of a horseshoe shaped tray having an inner arcuate wall 12 and an outer arcuate wall 13 and, as illustrated in Figure 2, the walls and ends of the tray are provided with rolled edges, as indicated by the numeral 14, the rolled edges forming beads that may be rolled as shown or which may be cast integral with the material of the tray or formed with solder connecting the rolled edges to the body of the tray.

In the form shown, the tray is provided with perforations 15 that extend over the end surface and side walls thereof as shown.

The tray may also be provided with an arm providing a handle 16, the outer end of which is provided with an opening 17 and the inner end of which is adapted to be secured to the tray by welding or with rivets or other fastening elements.

In the form illustrated in Figure 2, pins 18 are provided with studs 19 that extend through openings 20 in a wall 21 of the tray and the ends of the studs are riveted over providing heads 22 by which the pins are secured to the tray. In this form, the tray is provided with a rolled edge 23, similar to the edge 14, and the body and walls are provided with perforations 24.

In the form illustrated in Figure 8, pins 25 are provided with threaded studs 26 which extend through openings 27 in a wall 28 of the tray and the pins are secured in position with nuts 29 having knurled surfaces whereby the pins are adapted to be removed and replaced.

The portion of the tray shown in Figure 8 is also provided with perforations 30 and a rolled edge or bead 31.

In the form illustrated in Figures 3, 4, and 5, a tray 32 is provided with a horseshoe-shaped insert 33 having spaced pins 34 extended from the upper surface and the insert is patterned so that it may be positioned in the U-shaped trough at the periphery of the tray for use and so that it may readily be removed for cleaning. With an insert formed as shown and described, the insert may be of an suitable size or shape and may contain as many pins as may be desired.

As illustrated in Figure 6, an insert 35 with pins 36 extended therefrom is adapted to extend across an indented portion 37 at the end of a tray 38, the inner surface of the portion 37 being in the form of a drop wall and being in a plane spaced from side surfaces 39 and 40. The walls and lower surfaces of the tray 38 are also provided with perforations 41 and the tray is provided with a tab or handle 42. The tray 32, shown in Figure 3, is also provided with a plate or handle, as indicated by the numeral 43.

With the parts formed as disclosed and described, spacing pins may be made integral with a dental impression tray or may be provided on inserts adapted to be positioned in a tray and as alginate or other impression material is placed in the tray, the pins will be embedded therein and, with the pins dimensioned and positioned to be engaged by end surfaces of teeth biting into the material, movement of the teeth toward surfaces of the trays will be limited. By this means, also, the thickness of material connecting side walls of a mold from which a denture is cast is sufficient to retain the side walls in spaced relation and whereby an exact or true cast may be made.

The spacing pins may be used in trays of different types and forms and the falls of the trays may or may not be provided with perforations, as may be desired. It will also be understood that the number of pins used may be varied to compensate for different types of dentures to be cast or formed and the pins may be freely positioned in the trays or made integral therewith as may be desired.

Referring now to the Figures 9–14, the improved impression tray of this invention also includes a base 50, having an inner side wall 51, an outer side wall 52, and a tongue 53, and the base 50 is provided with a strip of material 54 having a thin, sharp, razor-like upper edge 55.

Figure 10:
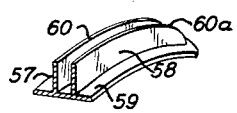
Figure 10 is a view showing a spacing element, similar to that shown in Figure 9, showing a modification wherein the single strip of material is replaced with a pair of strips of material.

The base and inner and outer walls of the tray are provided with perforations 56, and in the form shown in Figure 10, the strip 54 of Figure 9 is replaced with a pair of strips 57 and 58, which may be mounted directly in the tray, similarly to the strip 54, shown in Figure 9, or on a base 59 providing an insert adapted to be dropped into a tray. The strips 57 and 58 are provided with sharp, razor-like upper edges 60, 60a.

In the form illustrated in Figure 9, the strip 54 is essentially integral with the base 50 of the tray, being secured thereto, such as by welding, soldering or the like.

The upper edge 55 of the strip 54 is relieved in the anterior region wherein the upper edge 55 is one millimeter lower than it is in the posterior region.

Figure 11:
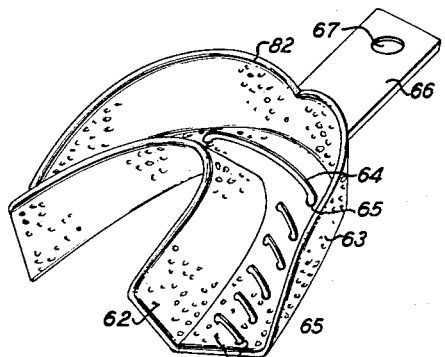
Figure 11 is a view similar to that shown in Figure 9 showing a perforated impression tray with a continuous strand of material, such as wire, having a sharp upper edge and laced through perforations of the tray to provide spacing elements.

The tray illustrated in Figure 11 has a base 61, an inner side wall 62 and outer side wall 63 and a wire 64 laced through perforations 65 in the base of the tray, the wire 64 being formed to provide a sharp, razor-like upper edge. A spacing element comprising spaced webs is thus provided in which the parts are positioned to be engaged by the teeth to limit movement of the teeth in relation to the base 61 so that sufficient impression material is retained to hold the impression together. The tray shown in Figures 11 and 12 is provided with a tongue 66 having an opening 67 therein.

Figure 13:
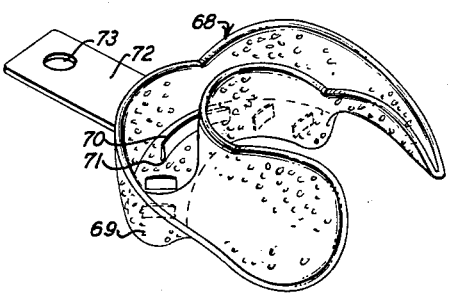
Figure 13 is a view showing a perforated tray with a depression having a spacing element in the forward portion thereof.

In the form illustrated in Figure 13, a tray 68, having a depression 69 therein is illustrated and, in this form, strips 70 are positioned in the depression 69 as at 71 forming spacing elements therein. It will be understood that the spacing elements may be in the depression or in substantially flat trays, as shown in Figures 9 and 11. The tray 68 is also provided with a tongue 72 and the tongue is provided with an opening 73.

Figure 14:
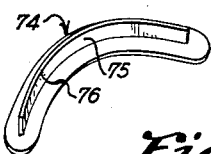
Figure 14 is an insert having a strip of material providing a spacing element thereon and in which the insert is adapted to be used in an impression tray.

In Figure 14 an insert 74 is shown as having an upstanding strip of material 75 with a sharp, upwardly directed cutting edge 76. It will be understood that, with the strips 70 absent, the insert shown in Figure 14 may be dropped into the depression 69 to provide spacing means between the end surfaces of teeth and the upper surface of the depression. The insert 74 may be provided with a "zigzag" strip, or with a straight strip as shown in Figure 9, or the insert may be provided with perforations and a wire or strip, such as the wire 64 may be laced through the perforations or otherwise secured in the tray to provide spacing means for spacing teeth in the depression.

Figure 12:
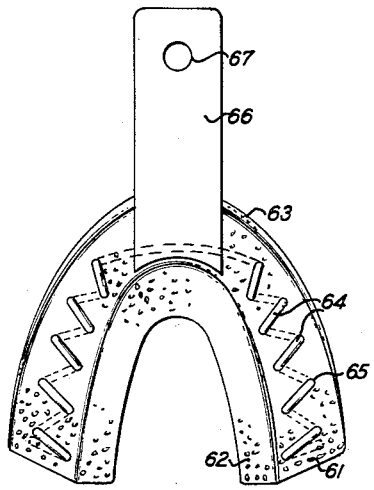
Figure 12 is a view looking upwardly toward the under surface of the tray shown in Figure 11.

In the form illustrated in Figures 11 and 12, the spacer element of my invention includes upstanding sharpened-edge portions positioned in angular relationship with the arcuate center-line of the tray or base. It can be seen in Figure 12 that the wire itself, laced into the base, alternately crosses or is in angular relationship with the arcuate center line of the base. Thus the teeth-contacting sharp upper edge of my spacer lies across the line of the occlusal teeth surfaces, insuring contact with sufficient teeth, while further minmizing the area excluded from the impression.

It will be understood, therefore, that one or a plurality of strips may be used and the strips may be straight, zigzag, or of any suitable design effective to provide contact with a sufficient number of teeth at a plurality of points along the occlusal surfaces thereof to prevent contact of teeth with the tray bottom, while insuring that only the minutest possible area of the teeth is held out of contact with the alginate material and therefore excluded from the resulting impression.

It will be understood that the zigzag path of my spacer element could extend from end to end of the tray base and that entire spacer could be welded to the upper base surface in teeth-contacting position without departing from the nature and scope of my invention.

The trays may be provided with straight upper surfaces or with arcuate upwardly extended ends, indicated generally at 82 in Figure 11, to facilitate positioning the trays in use.

Whereas I have described and claimed a practical and operative device, nevertheless, many changes may be made in the size, shape, number and disposition of parts without departing from the spriit of my invention. I therefore wish my description and drawings to be taken as, in a broad sense, illustrative or diagrammatic, rather than as limiting me to my precise showing.

The trays and spacing elements shown herein may, for example, be formed of any suitable, substantially rigid, material, such as metal or plastic, without departing from the nature and scope of my invention.

I claim:

1. A dental impression tray comprising a base and inner and outer side walls, said base having perforations therein, and a wire laced through perforations of the base, said wire having convolutions extending into the area between said sidewalls, said convolutions having each a sharp upper edge.

2. A dental impression tray comprising an arcuate base, teeth-enclosing side walls upstanding from the opposite sides of said base and a spacer element fixed on said base, said spacer element being formed of substantially rigid material and positioned between said side walls and below the upper edges thereof, said spacer element extending substantially from end to end of said base and having upstanding teeth contacting razor-like sharpened upper edge portions thereof extending in a path in acute angular relationship with the arcuate center line of said base.

References Cited in the file of this patent

UNITED STATES PATENTS

| | | |
|---|---|---|
| 1,422,488 | Smith | July 11, 1922 |
| 1,455,518 | Balter | May 15, 1923 |
| 1,669,335 | Highkin | May 8, 1928 |
| 2,117,846 | Kalvin | May 17, 1938 |
| 2,428,773 | Beresin et al. | Oct. 14, 1947 |
| 2,452,866 | Oertel | Nov. 2, 1948 |
| 2,577,513 | Cunningham | Dec. 4, 1951 |

FOREIGN PATENTS

| | | |
|---|---|---|
| 415,596 | Germany | June 25, 1925 |